United States Patent
Holzhey et al.

(10) Patent No.: US 8,532,612 B1
(45) Date of Patent: Sep. 10, 2013

(54) OBTAINING MOBILE INFORMATION FOR NETWORKED TRANSACTIONS

(75) Inventors: Bernd Holzhey, Neubiberg (DE); Sylvie Dieckmann, Munich (DE); Thomas Leidinger, Munich (DE); Markus Muehlbauer, Gilching (DE); Andreas Tuerk, Steinebach (DE)

(73) Assignee: Google Inc., Mountain View, CA (US)

( * ) Notice: Subject to any disclaimer, the term of this patent is extended or adjusted under 35 U.S.C. 154(b) by 540 days.

(21) Appl. No.: 11/694,830

(22) Filed: Mar. 30, 2007

(51) Int. Cl.
*H04M 11/00* (2006.01)
*H04M 3/42* (2006.01)
*H04W 4/00* (2009.01)
*G06Q 20/00* (2012.01)

(52) U.S. Cl.
USPC ........ 455/406; 455/405; 455/466; 455/414.1; 705/76

(58) Field of Classification Search
USPC .................... 455/405, 466, 414, 406; 705/76
See application file for complete search history.

(56) References Cited

U.S. PATENT DOCUMENTS

| | | | |
|---|---|---|---|
| 2003/0030751 A1 | 2/2003 | Lupulescu et al. | |
| 2003/0074313 A1 | 4/2003 | McConnell et al. | |
| 2003/0119478 A1 | 6/2003 | Nagy et al. | |
| 2003/0149781 A1* | 8/2003 | Yared et al. | 709/229 |
| 2004/0002324 A1 | 1/2004 | Juntunen et al. | |
| 2004/0019539 A1 | 1/2004 | Raman et al. | |
| 2005/0090230 A1 | 4/2005 | Liao et al. | |
| 2005/0114367 A1* | 5/2005 | Serebrennikov | 707/100 |
| 2006/0265339 A1* | 11/2006 | Vakil et al. | 705/76 |
| 2007/0005765 A1 | 1/2007 | Lamb et al. | |
| 2007/0287413 A1* | 12/2007 | Kleitsch et al. | 455/405 |
| 2008/0270299 A1 | 10/2008 | Peng | |

* cited by examiner

*Primary Examiner* — Kamran Afshar
*Assistant Examiner* — Omoniyi Obayanju
(74) *Attorney, Agent, or Firm* — Fish & Richardson P.C.

(57) ABSTRACT

A computer-implemented method of identifying a mobile device for carrying out a transaction includes receiving from a mobile device a purchase request, providing to the mobile device a redirect message to direct the mobile device to a device number identification service, and obtaining an identifier for conducting commerce with the device and using the identifier to request a transaction authorization from a billing service associated with the device.

20 Claims, 11 Drawing Sheets

OBTAINING MOBILE INFORMATION FOR NETWORKED TRANSACTIONS

TECHNICAL FIELD

The disclosure relates to systems and techniques for obtaining identifying information for a mobile device so that, for example, a user of the mobile device may be billed for a commercial purchase transaction.

BACKGROUND

Mobile devices like cellular telephones and personal digital assistants continue to grow in power and capabilities. As the bandwidth for such devices grows, the applications that are made available on mobile devices also expand and mature. For example, e-mail is now a common application on mobile devices, as is text messaging. In addition, with improved graphical interfaces, mobile device owners can use their devices to buy products and services on-line. For example, many people purchase video games, ring tones, or music for use on their cellular telephones. In addition, people can purchase other products, such as food, gifts, and other items, such as by using WAP, SMS, or other protocols.

In general, on-line purchases require the identification, in some manner, of the purchaser. The identification may be of the actual purchaser, or of an account associated with the purchaser. Various mechanisms may be used to make a transaction more or less anonymous also. However, mobile devices are typically controlled by a particular operator, or carrier, such as Sprint, AT&T, Verizon, NextTel and others, that tend to mask the identity of devices to some extent. Specifically, each operator may have particular protocols and other standards for sharing information with its subscribers and with third parties outside its network, such as through wireless access protocol (WAP) gateways. Such operational variability can make it difficult to obtain information about various mobile network subscribers, and may make it particularly difficult to obtain identifying information that will permit a third party to bill a mobile network subscriber. In addition, it may be desirable to prevent fraud in mobile transactions, such as by spoofing or identity theft.

SUMMARY

This document relates to systems and methods for obtaining identifying information about a mobile device so as to permit, for example, smoother integration of mobile on-line financial transactions. The disclosed techniques may be used to resolve a telephone number of a mobile device using WAP redirects to identify the appropriate user to bill for a transaction, such as the purchase of items on-line. Advantageously, certain implementations may permit an identification service from a buying process, whereby the service providing, for example, a mobile telephone number, does not additionally handle or control a financial transaction. Instead, the service may simply provide the identifying number. As such, a mobile device user may employ such features, for example, to support voice outcalls for information or for a callback on a support site, for SMS notification (e.g., telling a user that an item is back in stock, notifying about a voice or e-mail inbox, or notifying about calendar entries), and for billing.

In one implementation, a computer-implemented method of identifying a mobile device for carrying out a transaction is disclosed. The method includes receiving from a mobile device a purchase request, providing to the mobile device a redirect message to direct the mobile device to a device number identification service, and obtaining an identifier for conducting commerce with the device and using the identifier to request a transaction authorization from a billing service associated with the device. The identifier may be obtained in a uniform resource locator (URL) from the mobile device, and the uniform resource locator may be encrypted. The method may also include providing electronic content to the mobile device after obtaining authorization.

In some aspects, the method may further comprise booking a transaction with the billing service after the electronic content has been delivered. Also, the provided redirect message may comprise a WAP redirect. The WAP redirect can comprise a uniform resource locator containing a session ID and information associated with an address of the provider of the WAP redirect. In addition, the method may include decrypting the identifier before requesting a transaction authorization.

In another implementation, a computer-implemented method of providing identifying information for a mobile device commercial transaction is disclosed. The method comprises receiving from a mobile device a identity resolution request, requesting from a mobile carrier associated with the mobile device identity information, and receiving in response identity information regarding the mobile device, providing the identity information for use by a marketplace, and providing a redirect message to direct the mobile device to a site associated with the mobile marketplace for effecting a transaction involving payment by a user associated with the mobile device. The identity resolution request can be received in a uniform resource locator (URL).

In some aspects, the method can also include identifying the mobile carrier associated with the mobile device The redirect message can include information in the identity resolution request and the identity information. In addition, the redirect message can include a session ID associated with the identity resolution request. Moreover, the redirect message may comprise information encrypted using a key that is shared with the mobile marketplace.

In some aspects, the method may further comprise determining whether identity information has previously been requested for the mobile device during a session, and may also comprise providing the identity information directly to a billing system. The billing system can be part of a common system with the marketplace.

In yet another implementation, a system for identifying mobile devices for carrying out purchase transactions is disclosed, and comprises a marketplace server configured to redirect mobile devices to a mobile device identification server, and a mobile device identification server configured to receive redirected mobile devices, request identity information from carriers associated with the mobile devices, and redirect mobile devices back to the marketplace server. The identification server may be further configured to provide identity and session information with redirect messages sent to the mobile devices. In addition, the system can include corresponding encryptors and decryptors associated with the marketplace server and the identification server to protect the identity information. Also, the marketplace server and the identification server can redirect mobile devices using HTTP redirects.

In another implementation, a system for identifying mobile devices for carrying out purchase transactions is disclosed. The system comprises an interface adapted to receive a redirected message from a mobile device, an identity requester configured to associate the mobile device with a mobile operator and to obtain identification information about the mobile device, and means for redirecting the mobile device for completing a purchase transaction.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
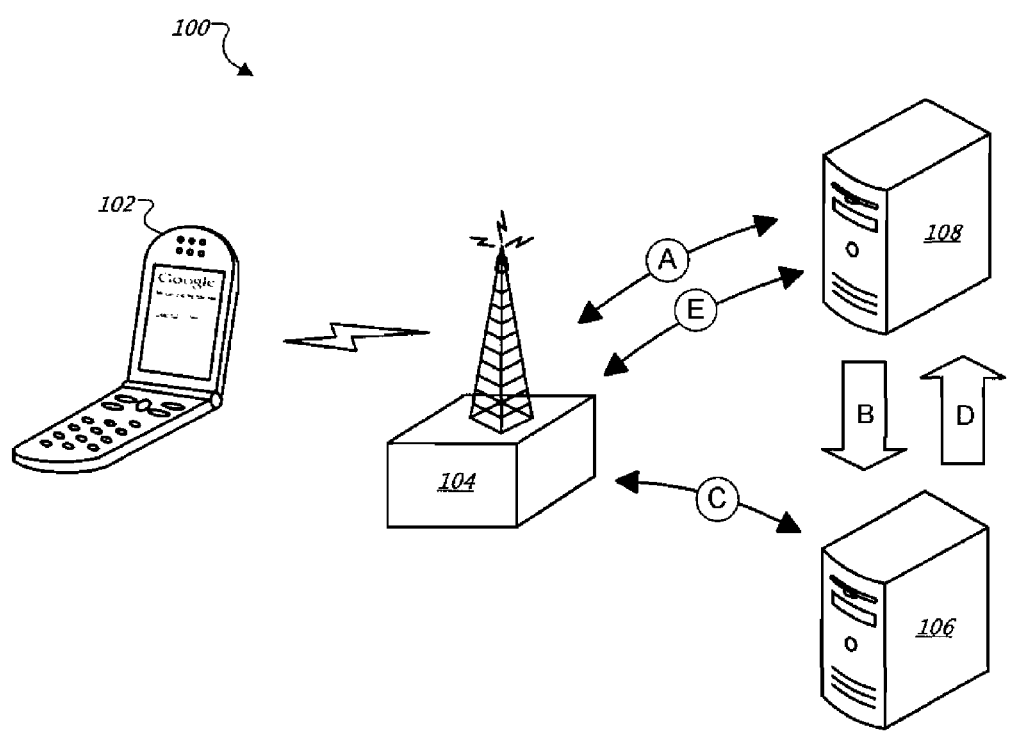
FIG. 1 shows a conceptual diagram of a process that redirects the actions for a mobile device.

FIG. 1 shows a conceptual diagram of a process 100 that redirects the actions for a mobile device. The items in the figure and the process 100 are shown in highly simplified form for clarity. In general, a mobile device 102 communicates with a commerce server 108, and is redirected by the commerce server 108 to communicate with a number resolution server 106. The mobile device 102 thereby causes information identifying a user of the mobile device 102, such as a telephone number, to be obtained by number resolution server 106 and shared with commerce server 108.

The depicted process 100 may be useful, for example, in an online purchasing scenario, by which a user of a mobile device wishes to obtain items or services in exchange for money. The process may permit an e-commerce website to identify a particular user or account associated with a user, and thereby to submit a bill for payment by the user. In one exemplary scenario, the item being purchased by a user may be mobile telephone ringtones, and the user may be billed on their telephone bill for purchased ring tones. Other applications may also use process 100. The exemplary process 100 may allow the e-commerce website to obtain a telephone number for the user or user's device, and to carry out a transaction (such as a financial billing transaction) using the number, with little involvement from the number resolution server 106.

Mobile device 102 may take a variety of forms. For example mobile device 102 may include a cellular telephone, a personal digital assistant, a laptop computer, or other appropriate device. In general, mobile device 102 may be provided with a graphical display on which a user may interact with online systems, such as online commerce systems. The user may be presented with information about such systems, and may enter information, such as on a standard telephone keypad, to order and purchase goods or services. Operation of mobile device 102 may also occur aurally, using voice synthesis by a mobile device 102, and spoken commands by a user of mobile device 102. The mobile device 102 may communicate by various protocols including, for example, the Wireless Access Protocol (WAP).

Mobile carrier 104 may include a system with which mobile device 102 communicates, such as a system to which the user of mobile device 102 is a subscriber. For example, mobile carrier 104 may include various cellular telephone carriers that provide voice and/or data communications with mobile devices. Mobile carrier 104 may provide for billing to a user of mobile device 102. The billing may include bills for monthly service charges, in addition to bills for items or services purchased by a user of mobile device 102 using mobile carrier 104. The mobile device 102 may in addition, or alternatively, be billed separately from mobile carrier 104, such as by a system working with mobile carrier 104 or by another system.

Commerce server 108 may include one or more servers directed toward taking orders for goods or services from users and fulfilling those orders. For example, commerce server 108 may provide items such as music or video files, or ring tones, to users of mobile devices. Commerce server 108 may also serve as an intermediary that books orders for other items rather than providing the items in itself. For example, commerce server 108 may take orders from users and may cause other entities or systems to deliver and execute on the orders. Various arrangements of servers, and systems or subsystems, may be employed to provide for the ordering and delivery of goods and services to users.

Number resolution server 106 may coordinate with commerce server 108 and mobile carrier 104 so that the identification of mobile device 102 may be determined, and billing for a commercial transaction carried out. The mobile device 102 may be identified, such as by its cell phone number or other appropriate identifier. The reference to a number here includes identification numbers that are made up in whole or in part of alphabet letters (e.g., alpha, numeric, or alphanumeric identifiers). In general, the number resolution server 106 is called by mobile device 102 after mobile device 102 contacts commerce server 108, and is redirected by commerce server 108 to number resolution server 106. Number resolution server 106 may then obtain an identification number for mobile device 102 from mobile carrier 104. Number resolution server may then pass mobile device 102, and information about the mobile device number, back to commerce server 108, which may complete a transaction.

The number resolution server 106 may, among other things, provide a WAP service for WAP-enabled mobile devices. The service may gather appropriate information, such as through one or more messages from a mobile device, and may call the appropriate interface or interfaces of a carrier associated with a particular mobile device. The service may then redirect mobile device 102 back to commerce server 108 and may provide in combination identification information to be used by commerce server 108 (e.g., in a redirect message sent to mobile device 102).

The arrows marked with letters in the figure show an exemplary flow of information in process 100. As a first step exemplified by Arrow A, mobile device 102 interacts with commerce server 108 through mobile carrier 104. When commerce server 108 needs an identification number for mobile device 102, it may redirect mobile device 100 to number resolution server 106, as shown by Arrow B. The re-direct may follow a standard HTTP computer protocol using a URL re-direction method. An exemplary message may take the form of: http://<wap resolution server url>?sessionid=3434343&checksum=ED4AE628AC6BD As shown, the url parameters may be hashed with a shared secret, with the hash being added to the URLs. Other appropriate protection or other encryption techniques may likewise be used.

The mobile device 102 will then pass the URL parameters to the number resolution server 106. The number resolution server 106 may then determine the identity of the mobile carrier for the mobile device 102, such as by determining the carrier that passed the request from the mobile device 102. The number resolution server 106 may then request identification information for the mobile device 102 from mobile carrier 104. Such a request and any subsequent responses may occur using whatever communications standards have been defined by or for mobile carrier 104. A response from mobile carrier 104 may include, for example, a telephone number for mobile device 102.

Number resolution server 106 may then redirect mobile device 102 back to commerce server 108, and may include identification information received from mobile carrier 104. Such information may include the telephone number for mobile device 102, or information related to such a telephone number. The information may be passed through mobile device 102 in the form of a redirect message, similar in manner to the prior redirect message provided by commerce server 108. An exemplary message may take the form of: http://<merchant wap>?sessionid=3434343&&msisdn=12345678checksum=EF4AE65A52B8

This message may cause mobile device 102 to be re-directed back to commerce server 108, and to cause the related information such as the mobile device ID number to be passed to commerce server 108. A session ID number may be used by commerce server 108 to match the response back up with the original session, which may in turn be associated with a particular transaction, so that the transaction may be completed using the identification information for mobile device 102.

Advantageously, the described process 100 may permit the number resolution server 106 to determine that a mobile phone number has already been resolved for a particular session. Such an ability may be used to prevent hacking, such as by the use of so-called reply attacks that attempt to elicit and gain information that has already been provided to mobile device 102. In addition, the described process 100 may permit other systems such as billing services to verify that a given mobile number is the resolved number. Further details of process 100 and similar processes and systems are provided below.

Figure 2A:
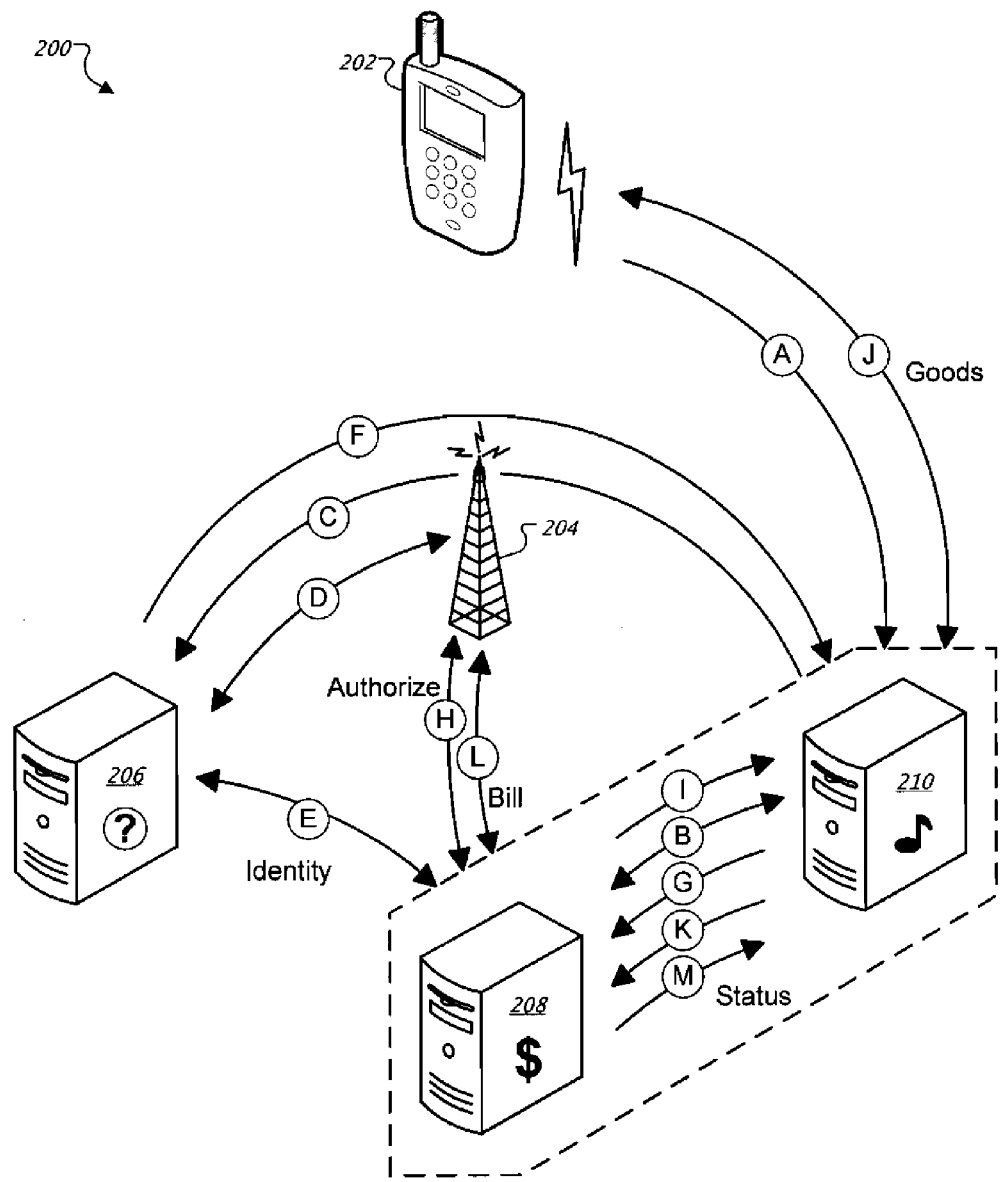
FIG. 2A shows a conceptual flow diagram of a redirect process for obtaining identifying information for a mobile device.

FIG. 2 shows a conceptual flow diagram of a redirect process 200 for obtaining identifying information for a mobile device. Process 200 is similar to process 100 shown in FIG. 1, but includes additional detail regarding how a redirect process may be implemented. As in FIG. 1, the process involves a mobile device 202 and a number resolution server 206. The commerce server 108 has been replaced here by a mobile billing server 208 and a mobile marketplace server 210. The mobile marketplace server 210 may include for example, a server or servers dedicated to carrying out transactions for goods or services available over the Internet. One example of such goods or services includes the sale of online music or online ring tones for mobile devices. The mobile billing server 208 may coordinate with the mobile marketplace server 200 and cause accounts associated with users accessing the mobile marketplace server 210, and with vendors or a marketplace, to be billed or credited, or otherwise affected when a transaction is carried out.

The mobile billing server 208 and the mobile marketplace server 210 may be implemented in a variety of manners. For example, both servers 208, 210 may be implemented in a single physical computer server. Alternatively, mobile billing server 208 may be operated by a billing organization, while mobile marketplace server 210 may be operated by a different organization. Such an implementation may be used where certain security features depend on separation of the marketplace and billing functions, or, for example, where specialization of functions is considered to be a more efficient implementation. In different implementations, the mobile billing server 208 may be operated separately from the mobile marketplace server 210, but by a common organization. Such an implementation may be beneficial, for example, where an organization provides many different services to users, so that it may use a single mobile billing server 208 for all of those services, including mobile marketplace services.

An exemplary flow of messages for process 200 is showing by lettered arrows in FIG. 2. The letters for each arrow represent a chronological order for particular processes. Arrow A shows a request from mobile device 202 to mobile marketplace server 210, such as a request to purchase online music through an online music store. Mobile marketplace server 210 may interpret the request, and may in turn create a session with the mobile billing server 208, as shown by Arrow B. The mobile billing server 208 may then return information regarding the session to the mobile marketplace server 210, and may retain such information for later use.

The mobile marketplace server 210 may then redirect mobile device 202 to number resolution server 206 using an HTTP URL redirect message like that discussed above, as shown by Arrow C. The redirect message may cause mobile device 202 to send information, in the form of a redirected URL, to number resolution server 206. This information may be treated by number resolution server 206 as a number resolution request. The number resolution server 206 may then determine the identity of the carrier for mobile device 202 and may make an identity request to carrier 204 to obtain identity information about mobile device 202, such as the mobile telephone number of mobile device 202. Carrier 204 may respond, using appropriate protocols, with such identity information, as shown by Arrow D.

The communications between number resolution server 206 and carrier 204, like other communications described here, may be protected in various manners. For example, number resolution server 206 may be required to identify itself to carrier 204 before obtaining information. In addition, communications between number resolution server 206 and carrier 204 may be encrypted or otherwise protected. Also, information passed by number resolution server 206 may be encrypted, so that number resolution server 206 may not obtain or alter the information. Other protection techniques may also be employed to prevent tampering or hacking of process 200.

Once number resolution server 206 obtains identity information, it may pass that information or related information to mobile billing server 208 and/or mobile marketplace server 210. For example, number resolution server 206 may directly pass identity information to mobile billing server 208, as shown by Arrow E.

In addition, or alternatively, number resolution server 206 may redirect mobile device 202 back to mobile marketplace server 210. The redirection may occur in a manner similar to that discussed above for FIG. 1, such as by the use of a URL that includes a session ID, and may also include identity information.

Identity information may be kept away from mobile marketplace server 210 in situations where security is a concern. Such an implementation may occur by encrypting the identity information in a manner that mobile marketplace server 210 cannot determine it, but may pass it on to mobile billing server 208, which may determine the identity information. Other similar techniques may also be used to provide security from services in the system that are not fully trusted.

The redirection of mobile device 202 back to mobile marketplace server 210, as shown by Arrow F, may be interpreted as, or accompanied by, a request to execute a transaction. The execution of the transaction may involve, for example, delivery of content to mobile device 202. Upon receiving such a request, mobile marketplace server 210 may begin processes for starting payment on the transaction and authorizing the transaction, as shown by Arrow G.

Mobile billing server 208 may then, in situations where billing of the user of mobile device 202 is to occur through their telecommunications bill, request authorization from carrier 204, as shown by Arrow H. Carrier 204 may then respond by providing a status of the authorization, such as by indicating that authorization is granted or denied. Mobile billing server 208 may then forward information about the status of authorization to mobile marketplace server 210, as shown by Arrow I.

If the transaction has been authorized, mobile marketplace server 210 may begin delivery of the goods or services, such as by performing a download of electronic files to mobile device 202 using an agreed-upon protocol. Mobile device 202 may track the progress of the delivery, and may report back to mobile marketplace server 210 once the delivery is complete (Arrow J). Other mechanisms for carrying out the delivery of goods or services, and confirming the completion of such delivery or performance, may also be used. For example, where physical goods are to be delivered by freight, delivery confirmation from a carrier such as Federal Express or UPS may be used to trigger a confirmation of delivery. Also, a mobile device may confirm delivery with its associated carrier in addition to, or instead of, its confirmation with the marketplace.

With the delivery confirmed, mobile marketplace server 210 may request that mobile billing server 208 charge out the transaction, as indicated by Arrow K. the request may include information regarding the confirmation of delivery, including information that may be independently verified by carrier 204 or mobile billing server 208. For example, mobile device 202 may embed in its response an encrypted message that cannot be determined by mobile marketplace server 210, but which can be determined by carrier 204. Alternatively, carrier 204 may contact mobile device 202 to verify the delivery of content. Such contact may occur using a particular session ID number so as to coordinate the information received by the carrier about the transaction with the actual transaction.

Upon receiving a request from mobile marketplace server 210 to charge a transaction, mobile billing server 208 may make a request to carrier 204 to bill the transaction, as indicated by Arrow L. Carrier 204 may then confirm or deny the ability to bill the transaction. If the request is confirmed, carrier 204 may, by appropriate mechanisms, add an amount for the transaction to the monthly bill of mobile device 202. Carrier 204 may likewise transfer an amount corresponding to the amount billed to mobile device 202, which may be an amount smaller than the amount billed to mobile device 202, to an account associated with mobile billing server 208. In a like manner, mobile billing server 208 may transfer a corresponding amount to an account associated with mobile marketplace server 210, when mobile billing server 208 and mobile marketplace server 210 are operated by different organizations. Where the servers 208, 210 are commonly owned, mobile billing server 208 may enter a ledger entry crediting mobile marketplace server 210 for the transaction. Mobile billing server 208 may also communicate to mobile marketplace server 210 the status of whether carrier 204 approved a charge against mobile device 202 or did not.

While the discussion here has spoken of an account for mobile device 202, such an account would normally be associated with a user of mobile device 202. Such an association may be one-to-one, such as where carrier 204 allows a particular user to have a single mobile device. The relationship may also be many-to-one, such as where multiple members of a family, each with their own mobile device, are billed in the same account. The relationship may also be one-to-many, such as where a particular user is able to execute transactions using multiple different mobile devices, but is billed on a single account. For example, a user may carry out transactions from their primary cellular telephone, but may also carry out transactions from a separate PDA, or a home telephone.

Figure 2B:
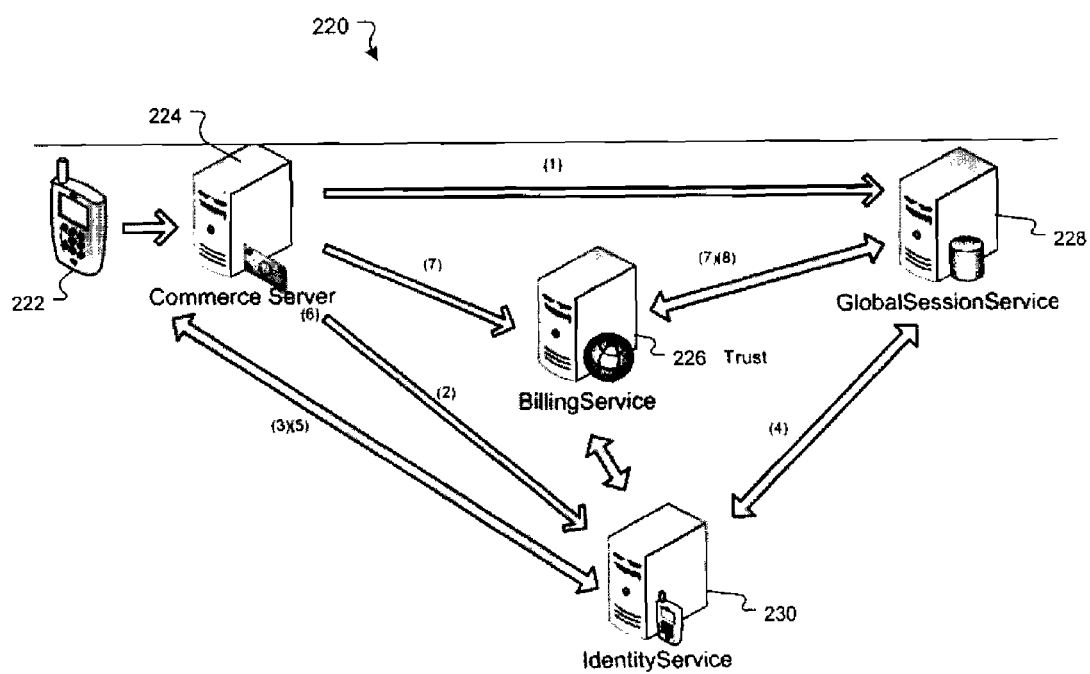
FIG. 2B shows a conceptual flow diagram of a redirect process for obtaining identifying information for a mobile device.

FIG. 2B shows a conceptual flow diagram of a redirect process 220 for obtaining identifying information for a mobile device. Again, a mobile device representing a user who seeks to carry out a transaction, such as a financial billing transaction, communicates with one or more servers, which may in turn operate or communicate with other servers or services. The particular arrangement of services, and the organization and number of servers, may be selected to match the particular application in which the services are being used.

In general, however, the process 220 serves a mobile device 222 with a commerce server 224 that obtains information for a session from a global session server 228, and uses that information to redirect the device 222 to an identity service 230, which resolves the mobile phone number for the mobile device 222, and redirects the mobile device 222 back to the commerce server 224.

Looking at the process 220 in more detail, a mobile device 222 represents a typical device used by a person who has entered into an agreement with a wireless carrier provided. A commerce server 224 may store or access information about various products or service that are for sale, and may interact with device 222 to allow a user of device 222 to identify and select various things to buy. A global session service 228 may generate and/or store session information, such as session ID's and tokens for session, and may provide such information to other components in the system. An identity service 230 resolves a mobile telephone number when an appropriate request is made for such resolution. And a billing service 226 gathers information to ensure that a transaction is legitimate, and causes an account associated with the mobile device 222 to be charged for a transaction.

The numbered arrow show an exemplary flow of information and functioning in FIG. 2B. At arrow (1), an application operating, for example, on the commerce server 224 creates a new session at the global session service 228, which in turn passes a Session ID and a Secure Token back to the device 222. The application then calls an interface at the identification service, at arrow (2) to provide information for a redirect of the mobile device 222. The request for the redirect information may include the parameters of Session ID, SecureToken, and redirect-url of the application. The response may take the form of the url of the identity service 230. The identity service 230 may then store the redirect-url in the session on the global session service 228.

The application on the commerce server 224 may redirect the device 222 to the identity service 230, using the url provided by the communication indicated by arrow (2). The application may also send an additional parameter, such as a new secure token or hash, so that the identification service 230 can ensure that the session ID (that may also be provided with the url) belongs to the user of the device 222, and to provide some authentification for the url. The redirected device (arrow (3)) may then access the identity service 230, which may verify the url and resolve the mobile phone number and store the number in the session (arrow (4)).

The identity service 230 may then redirect the device 222 to the application with a new secure token provided with the url so that the calling application can validate the redirect. The calling application may also be provided with the mobile phone number in appropriate manners. For example, the mobile phone number may be added to the parameters of the redirect-url. Alternatively, another interface associated with the identity service may allow the application to query the number, such as by submitting a request that includes the session ID and secure token, to generate a response that includes the mobile phone number (arrow (5)). The application (arrow (6)) then validates the secure token and retrieves the information from the url or by contacting the interface (arrow (5b)).

Where the process is used for a billing transaction, the commerce server 224 may then contact the billing service 226 to start a payment process (arrow (7)). The request may include parameters for the session ID, secure token, and mobile phone number. The billing service 226 can then retrieve the phone number from the global session service 228 and validate that the provided phone number is the same as the number retrieved from the identity service 230. By this process, the billing service 224 may verify that the calling application does not want to bill a different mobile user. The global session service 228 may be provided with an interface to cause the billing service 224 to mark a session as "billed" or to close a session, so as to prevent improper retrieval of additional identity information.

Figure 3:
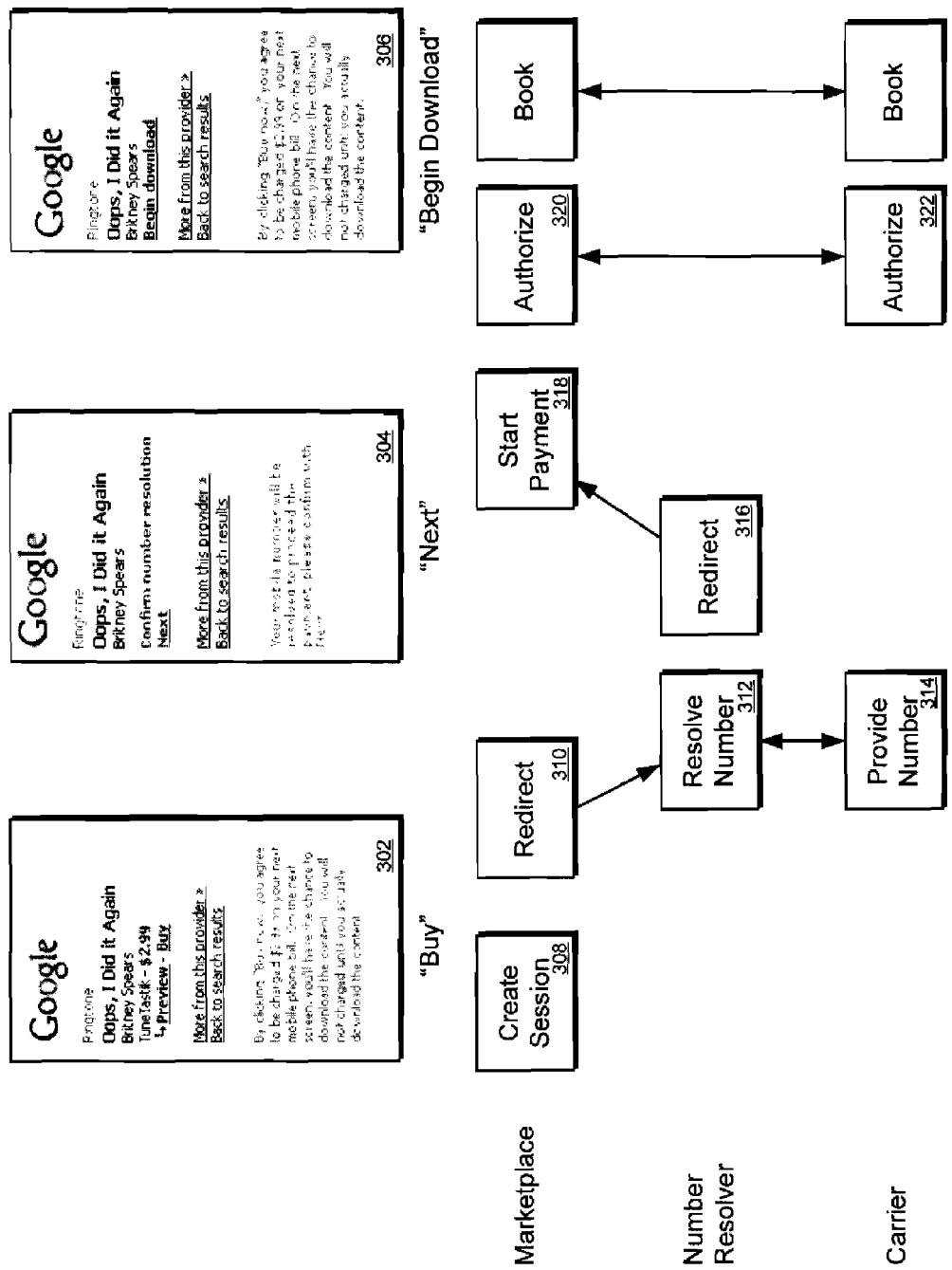
FIG. 3 shows another exemplary flow of information in relation to user interactions with a mobile billing system.

FIG. 3 shows another exemplary flow of information in relation to user interactions with a mobile billing system. In general, graphical displays on a mobile device are shown along the top of the figure, with user selections shown below each display. The displays are shown chronologically from left to right. Below the displays are shown general actions that may be taken by three different entities in providing information to a user, and receiving responses from the user associated with the displays. The entities include a marketplace, the number resolver that obtains identification information for a mobile device, and a carrier for the mobile device. It should be appreciated that the various entities may be combined in certain implementations, or may be separated into multiple different entities in other implementations.

In the example, an initial screen is shown that would be displayed to a user after they have browsed for a musical ring tone online and have located a particular ring tone. The user is shown a title and artist for the ring tone, a provider and price for the ring tone, instructions for interacting with the system, and links that allow the user to preview or listen to the ring tone, and to buy the ring tone. In this example, the user selects the "buy" link. Such an action causes the marketplace to create a session (box 308), which may include generating a WAP callback URL for directing a mobile device to the number resolver, and for providing information so that the number resolver can redirect the mobile device back to the marketplace. The creation of the session may result in a session ID and a redirect URL which may be passed in a redirect message to the mobile device. The message may be hashed or otherwise protected from theft or hacking.

The marketplace may then issue the redirect message (box 310), and for security, the mobile device may provide the user with an opportunity to approve or not approve redirection of the user device, as shown by screen 304. If the user selects the "Next" link on screen 304, the message may be passed to the number resolver for WAP number resolution. The number resolver may then make a request to the user's carrier to resolve the number (box 312), and the carrier may provide identification information such as a mobile telephone number (box 314). The number resolver may then redirect the mobile device back to the marketplace (box 316). Such redirection may occur via a redirect message that may be associated, such as using a session ID, with the earlier redirect message, and may include additional information such as identification information for the mobile device. Again, the passed information may be hashed or otherwise protected. Such protection may include, for example, a checksum with a MD5Hash over the session ID, the identification information, and a secret.

Upon receiving redirect information from the mobile device, the marketplace may then start a payment process (box 318). The marketplace may start a payment process, and may include various information for that process, such as a session ID, a country for the user, a currency for the user, the amount of a transaction in the currency, an amount of tax to be added to the transaction, identification information for the user or mobile device, and information about the item or service in the transaction, such as a song title, an artist, a publisher, a short code for the item, a content provider, and a content ID. Such information may be used, for example, to provide identifying information for the transaction on a user's bill, and to audit or otherwise track a transaction. For example, the information may be used in determining royalty payments for an artist or publisher based on the number of times a particular item has been delivered.

If the start of payment is successful, the marketplace may then ask for authorization for a transaction (box 320), and the carrier may provide such authorization (box 322). The marketplace may pass certain information, such as that discussed immediately above, to the carrier, for carrying out the authorization. For example, the marketplace may pass identification information for a mobile device, along with a title of a ring tone and an amount and tax for a transaction. Once the transaction is authorized, screen 306 may be displayed by the marketplace for a user to began a download of online content. If the user selects the "begin download" link, delivery of a ring tone can begin. When delivery is complete, the mobile device may confirm the delivery with the marketplace, and the marketplace may seek to book the transaction (box 324) with the carrier (box 326), so that the user account is billed by the carrier and so that the carrier is billed by the marketplace or with a billing engine associated with the marketplace.

Figure 4:
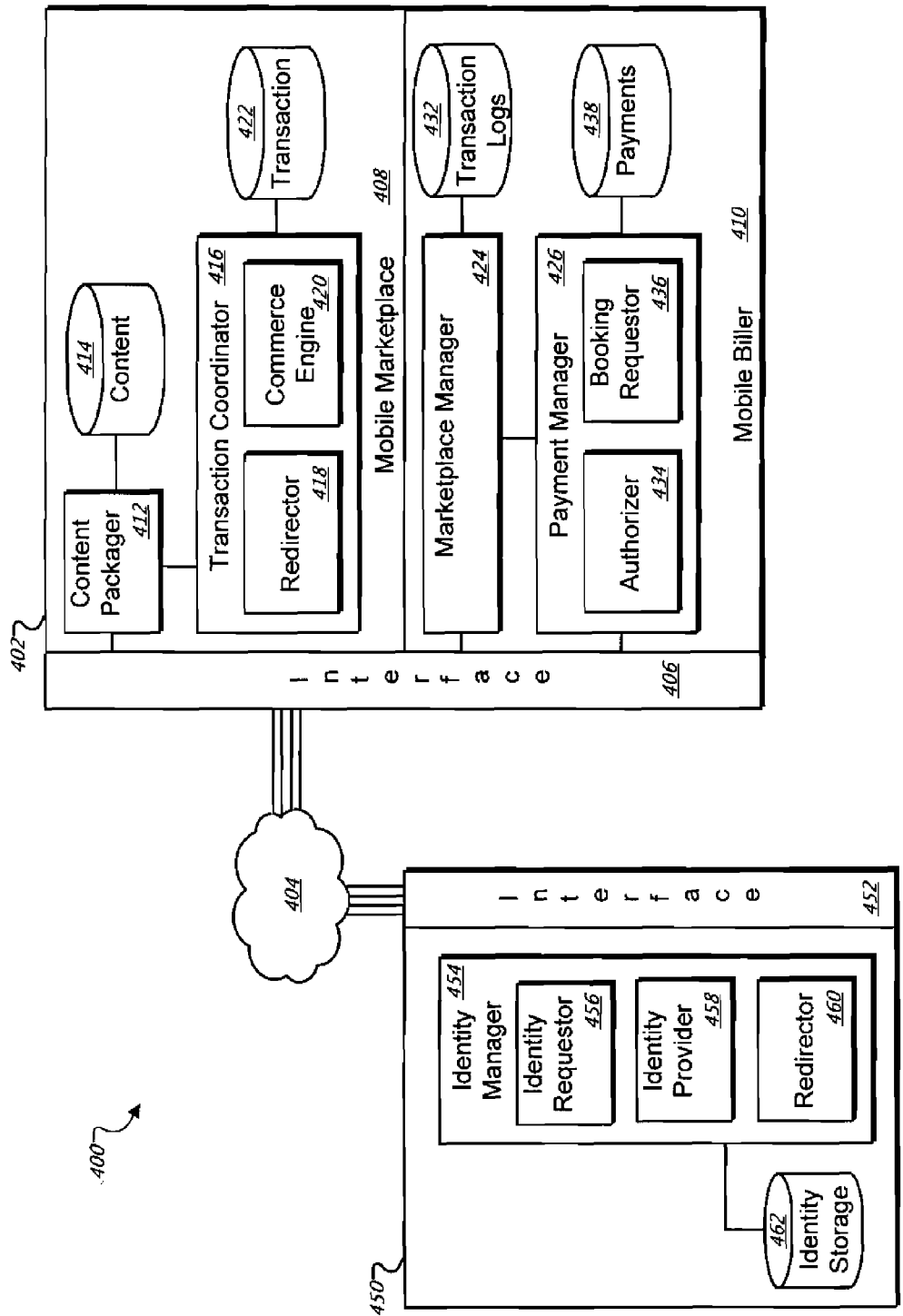
FIG. 4 is a schematic diagram of systems for carrying out mobile transactions.

FIG. 4 is a schematic diagram of a system 400 for carrying out mobile transactions. As shown, two systems—a commerce server 402 and an identity server 450—communicate through a network 404 such as the Internet. The commerce server 402 includes a mobile marketplace server 408 and a mobile biller server 410. As discussed above, servers 402, 450 are described here as servers for clarity, but may be implemented in various forms including using multiple different computers, and multiple computers which each handle only a portion of the structure discussed here for the servers 402, 450.

Identity server 450 communicates with network 404 through interface 452, which may take a variety of appropriate forms. Interface 452 may provide for interpreting and creating encrypted or otherwise obscure messages to prevent hacking and other interference with the system 400.

Identity server 450 includes an identity manager module 454 which receives and responds to requests to determine an identity of a device such as a mobile device. The identity manager module 454 includes an identity requestor 456, which may be programmed with appropriate code to contact one or more carriers associated with mobile devices according to a particular protocols for each carrier, and to obtain identification information for mobile devices or mobile device customers from the carriers. Identity manager module former 454 may also include an identity provider 458, which may interpret information obtained by identity requestor 456 and format it for being provided to other entities, such as commerce server 402. In addition, identity storage 462 may be provided to hold identity information for an appropriate period of time. For example, identity information may be stored for the time of a particular session or other appropriate time, and may be removed at the end of the time to prevent identity server 450 from unnecessarily storing identity information for users.

Redirector 460 may operate with identity provider 458 to provide redirecting messages to mobile devices. Such messages may include URLs that may contain information about user identities, such as information from identity provider 458.

The commerce server 402 includes an interface 406 by which commerce server 402 may communicate through network 404. Interface 406 may include, for example, one or more Web servers programmed to permit interaction with users, and with other systems such as identity server 450. Interface 406 may also permit communication between mobile marketplace server 408 and mobile biller server 410, where the servers 408, 410 are implemented by a single organization or in other similar situations.

The mobile marketplace server 408 in commerce server 402 includes structures for providing online content, such as music and ring tones, and for interacting with users and other components to carry out transactions for such content. Transaction coordinator 416 communicates with users to determine what items users would like to purchase, and to execute on the delivery of such items. Transaction coordinator 416 also includes a commerce engine 420, which may be a standard module for listing the items for sale to users, allowing users to search for or browse such items, and to select such items, and to began an ordering process for such items.

Redirector 418 may be provided to transmit redirecting messages to mobile devices such as to cause mobile devices to be directed to identity server 450. Redirector 418 may obtain information such as session IDs from commerce engine 420. In addition, transaction database 422 may store information about items for sale, about users of mobile marketplace 408, and about transactions that have occurred using mobile marketplace 408. For example, transaction database 422 may include transaction logs showing various transactions on the system 400, so that administrators on the system 400 may be allowed to run reports showing activity using the system 400.

For delivering content to users, mobile marketplace 408 includes a content database 414 and a content packager 412. The content database 414 may simply store files such as music, ring tone, and/or video files that may be subsequently delivered to users. The content packager 412 receives instructions from transaction coordinator 416 to provide content to users. For example, transaction coordinator 416 may instruct content packager 412 to send a file containing a snippet of a sound file, or to stream a sound or video file to a remote device. Alternatively, transaction coordinator 416 may instruct content packager 412 to deliver an entire ring tone, song, or video to a remote device, such as when a transaction has been confirmed by a carrier for the remote device, and identification information for the remote device has been obtained.

The mobile biller server 410 may be centered around a payment manager 426. The payment manager 426 may be responsible for obtaining authorization for payment from third parties, such as mobile carriers, and for obtaining payment from mobile carriers and providing payment to various mobile marketplaces. Data manager 426 include an authorizer 434 which receives a request to authorize a transaction from mobile marketplace 408 such as through marketplace manager 424. Authorizer 434 may then contact a carrier to obtain authorization to carry out a transaction with a subscriber to the carrier. In addition, payment manager 426 may include a booking requestor 436, which may be programs to contact a carrier after a subscriber for the carrier has received their ordered items, and to obtain money from the carrier, and cause the carrier to bill its subscriber a corresponding amount.

Payment manager 426 may draw upon payments database 438 to keep track of transactions that have occurred through mobile biller server 410. For example, payments database 438 may include information about account balances for various mobile marketplaces, and transaction balances with various telecommunications carriers. In this manner, mobile biller server 410 may serve as a billing clearinghouse for a number of different types of online transactions. Mobile biller server 410 may also include a transaction logs database 432. Transaction logs database 432 may track information about transactions that have occurred through mobile biller server 410 such as the identities of parties to the transactions, the amounts of the transactions including taxed amounts, and the items that were associated with particular transactions. Transaction logs database 432, payments database 438, and transaction database 422 may be combined in various manners, or split into other multiple databases, as appropriate.

Figure 5:
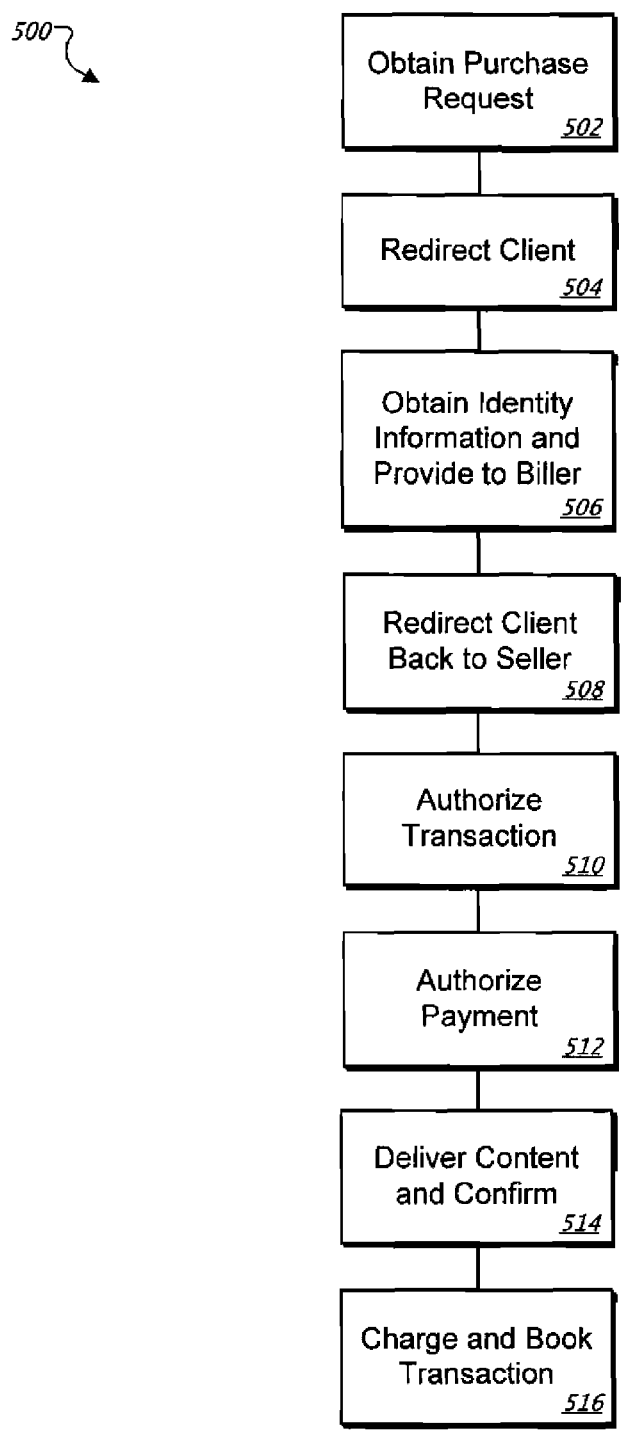
FIG. 5 is a flowchart showing actions for a process that redirects the actions of a mobile device.

FIG. 5 is a flowchart showing actions for a process that redirects the actions of a mobile device. The actions shown here are generally similar to those discussed above, for obtaining identification information regarding a remote device and for carrying out a commercial transactions using that information.

At box 502, a system obtains a purchase request, such as a request to purchase online items. At box 504, the system or redirects the client device that is associated with the purchase request to a service, such as a WAP service, that is programmed to obtain identity information about the client. At box 506, the service obtains the identity information and provides that information to a biller. The biller may be associated with the system originally obtaining the purchase request or may be a separate system.

At box 508, the WAP service redirects the client back to a seller that originally caused a redirect of the client to the WAP service. At box 510, the system seeks to authorize the transaction so that the transaction can go forward. For example, the system may seek authorization from a carrier associated with the client. When authorization is obtained the transaction can go forward, such as by the delivery of online content to the client. When such delivery is complete, payment may be authorized for the transaction, as shown at box 512. Delivery of the content may also occur after authorization for payment, such as shown at box 514. When delivery has been confirmed, appropriate accounts may be credited or debited, and the transaction booked, as shown at box 516.

Figure 6:
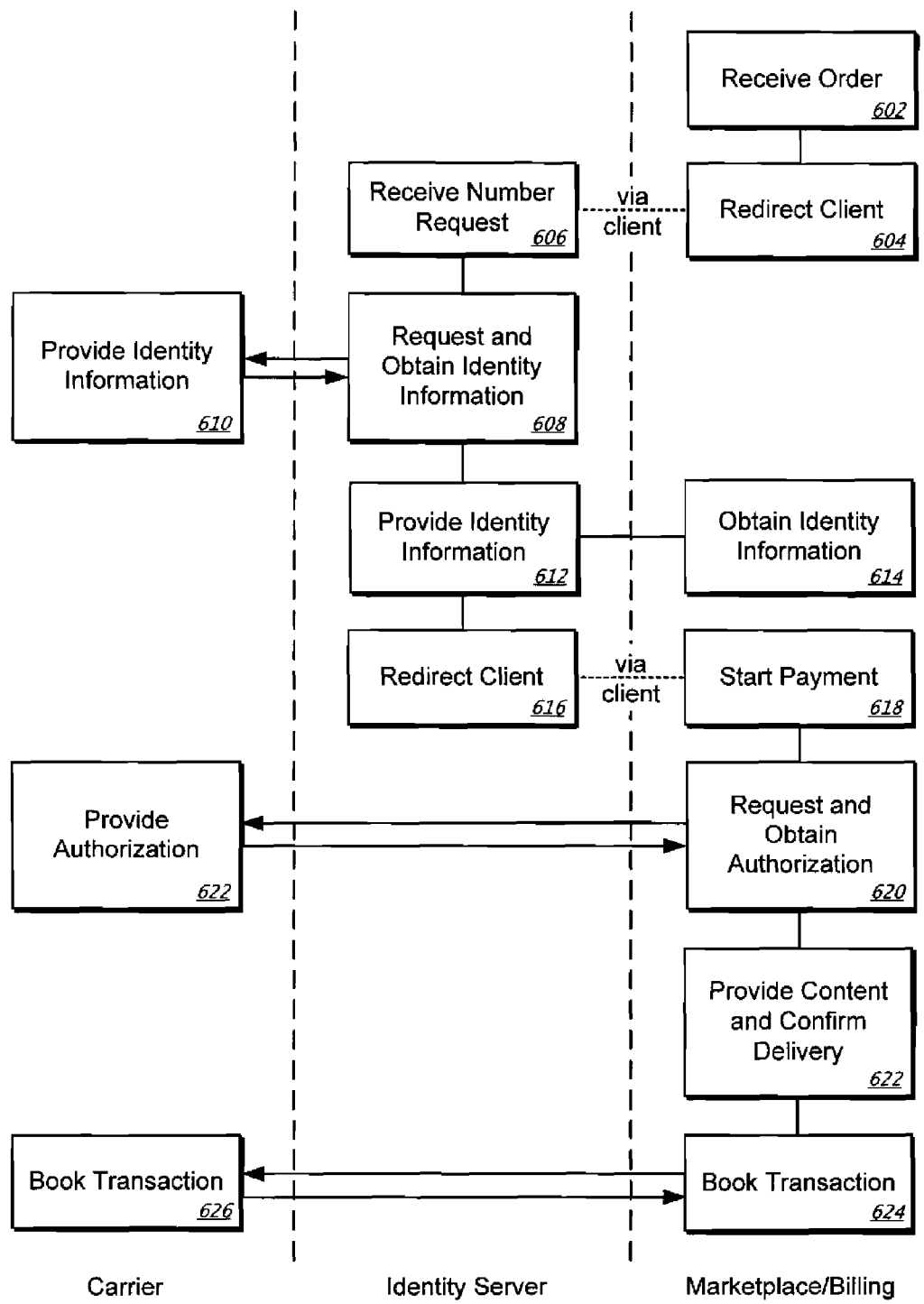
FIG. 6 is a swim lane diagram showing actions for a redirect process for obtaining identifying information for a mobile device.

FIG. 6 is a swim lane diagram showing actions for a redirect process for obtaining identifying information for a mobile device. The process shown here is similar to those discussed above but is shown to provide more clarity with respect to particular entities that may carry out different portions of the process. In this example, the marketplace and billing functions are shown as occurring with a single entity, although those functions could be split among multiple entities in manners similar to that discussed above.

At box 602, an order is received at a marketplace. The marketplace may include various forms of Internet accessible websites and other similar applications, that support the accessing and ordering of items by Internet connected users. The marketplace may then redirect a client that placed the order (box 604) to an identity server, and the identity server may thereby receive a number request (box 606) from the client. The identity server may then contact a carrier to request and obtain identity information for the client (box 608), and the carrier may provide such identity information (box 610). The identity server may then provide identity information (box 612), such as to a marketplace/billing system by directly sending the information to the marketplace/billing system (box 614).

In addition, or alternatively, the identity server may redirect the client to the marketplace/billing system to begin execution on the order (box 616). The marketplace/billing system may then begin a payment process (box 618) for the delivery of items, but which may begin with the request for authorization from the clients mobile carrier (box 620). Once the carrier provides authorization (box 622), the marketplace/billing system may provide content to the client and may confirm delivery of the content (box 622). When confirmation is obtained that the transaction has occurred, the marketplace/billing system may book the transaction with the carrier (boxes 624, 626).

Figure 7:
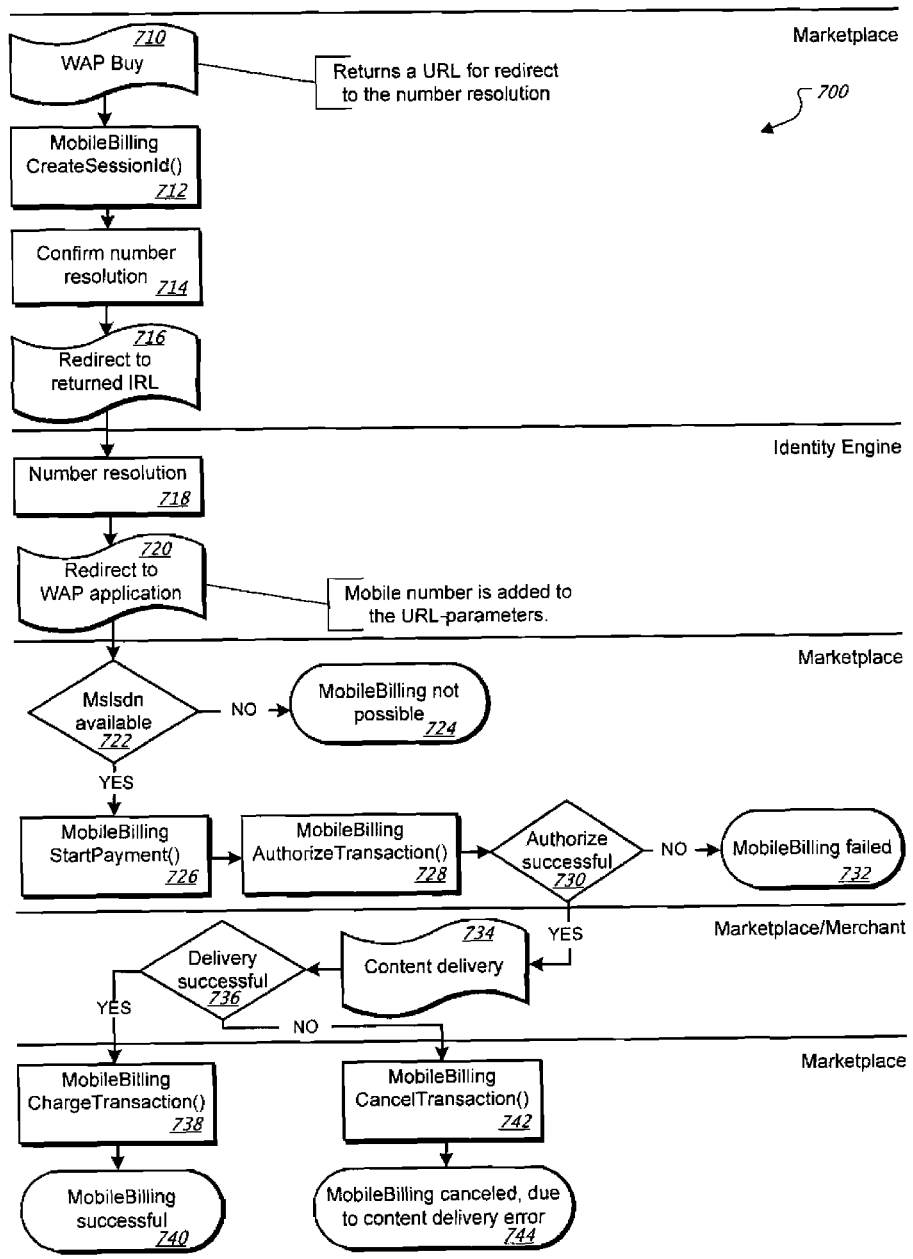
FIG. 7 is a segmented flow chart of a mobile billing process.

FIG. 7 is a segmented flow chart of a mobile billing process 700. Process 700 includes similarities to processes described above, but is directed toward a particular implementation for WAP enabled mobile devices.

At box 710, a mobile marketplace receives an indication from a WAP enabled device that the user would like to buy an item. The marketplace creates a session ID for billing an account holder associated with the device (box 712) and confirms that the device is capable of number resolution (box 714). The marketplace then provides a redirect message to the device to cause it to be redirected to an identity engine (box 716).

Upon receiving the redirected message from the device, the identity engine provides a service for resolving a number associated with the client device (box 718). Such a service may include contacting a carrier associated with the client device to obtain a telephone number for the device. When the number is obtained, the identity engine may send a redirect message back to a WAP application running on the client (box 720), to cause the client to be redirected back to the marketplace.

Upon receiving an indication from the redirected client, the marketplace may check to determine whether an identifying number was provided for the client, identified here as Mslsdn (box 722). If no identity number was provided, then mobile billing may not be possible for the transaction (box 724), and the marketplace may send a message to the client indicating that alternative billing methods will be needed, or that the completion of the transaction is not possible.

If an identity number is obtained, the marketplace may begin a start payment process (box 726), which may result in the marketplace attempting to obtain authorization for the transaction. Authorization may be sought, for example, from a mobile carrier associated with the client. If authorization cannot be obtained (box 730), then the mobile billing process may fail, and the marketplace may inform the client accordingly, such as by indicating that the transaction cannot be carried out, or will need to be carried out using different payment mechanisms (box 732).

If the authorization is successful, the marketplace or a merchant associated with the marketplace may begin delivery of items associated with the transaction, such as electronic delivery of digital content. When delivery is successful (box 736), such as indicated by an application on the client, billing may occur. The marketplace may then launch a charge transaction process that contacts the mobile carrier and also provides information to the merchant associated with the transaction (boxes 738, 740). When the delivery is not successful (box 736), the marketplace may launch a cancel transaction process (box 742), and may cancel the billing process, such as because the delivery of content was not successful (e.g., as determined by a check-up request form the mobile carrier to the mobile client).

Figure 8A:
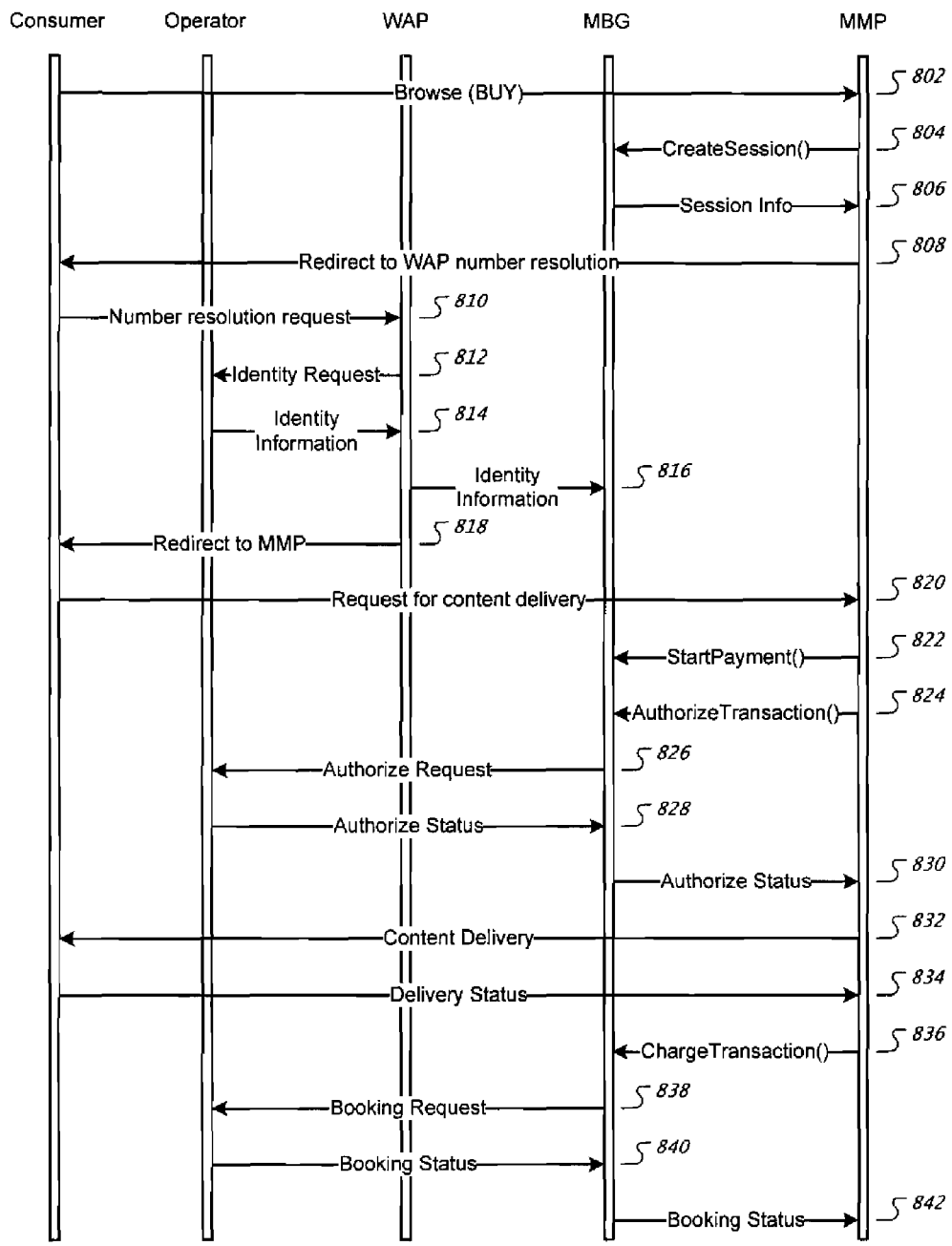
FIG. 8A is a sequence diagram for a system for providing billing for transactions from mobile devices.

FIG. 8A is a sequence diagram for a system for providing billing for transactions from mobile devices. Again, the process shown here bears similarity to processes described above, and is intended to exemplify particular steps that may be taken in approving and making payment on an account.

At action 802, a consumer indicates that they would like to purchase an item online. They therefore direct a message to a market, which may be exemplified in the form of an online store. At action 804, the market begins a create session process and contacts a biller to obtain information for the session (action 806). An action 808, the market than provides the consumer with a message that redirects the consumer's device to a WAP number resolution service. The device makes a number resolution request at action 810, and the service to which the device has been redirected then requests identity information from an operator, or mobile carrier, associated with the consumer (action 812), and the operator returns such identity information (action 814).

Upon receiving the identity information, the identifier server may pass such information to the biller (action 816), and may redirect the consumer's device to the market (action 818). The consumer may then be given the option to confirm their desire to obtain content, and may request delivery of such content (action 820). The market may, in response, invoke a start payment process (action 822), and an authorized transaction process (action 824). The processes may cause the market to communicate with the biller, so that the biller forwards a request for authorization to the operator (action 826). The operator may then provide the status of the authorization, such as by authorizing the transaction (action 828). The biller may then forward information about the authorization status to the market (action 830).

Upon receiving authorization, the market may begin delivery of items ordered by the consumer, such as by commencing digital online download of digital content (action 832). When the consumer's device determines that the delivery is complete, whether automatically or by an indication from the consumer, the market may begin a process to charge the transaction (action 836), and may communicate such activity to the biller. The biller may then request of the operator that the transaction be booked (action 838), so that the operator bills the consumer and the biller is paid by the operator a corresponding, but perhaps lesser, amount. The operator may then respond back with the status of the booking (action 840), which response the biller may subsequently use to establish an amount owing from the operator to the biller. Finally, the biller may notify the market of the status of the booking (action 842). That notification may be used by the market to establish an amount owing from the biller to the market.

Figure 8B:
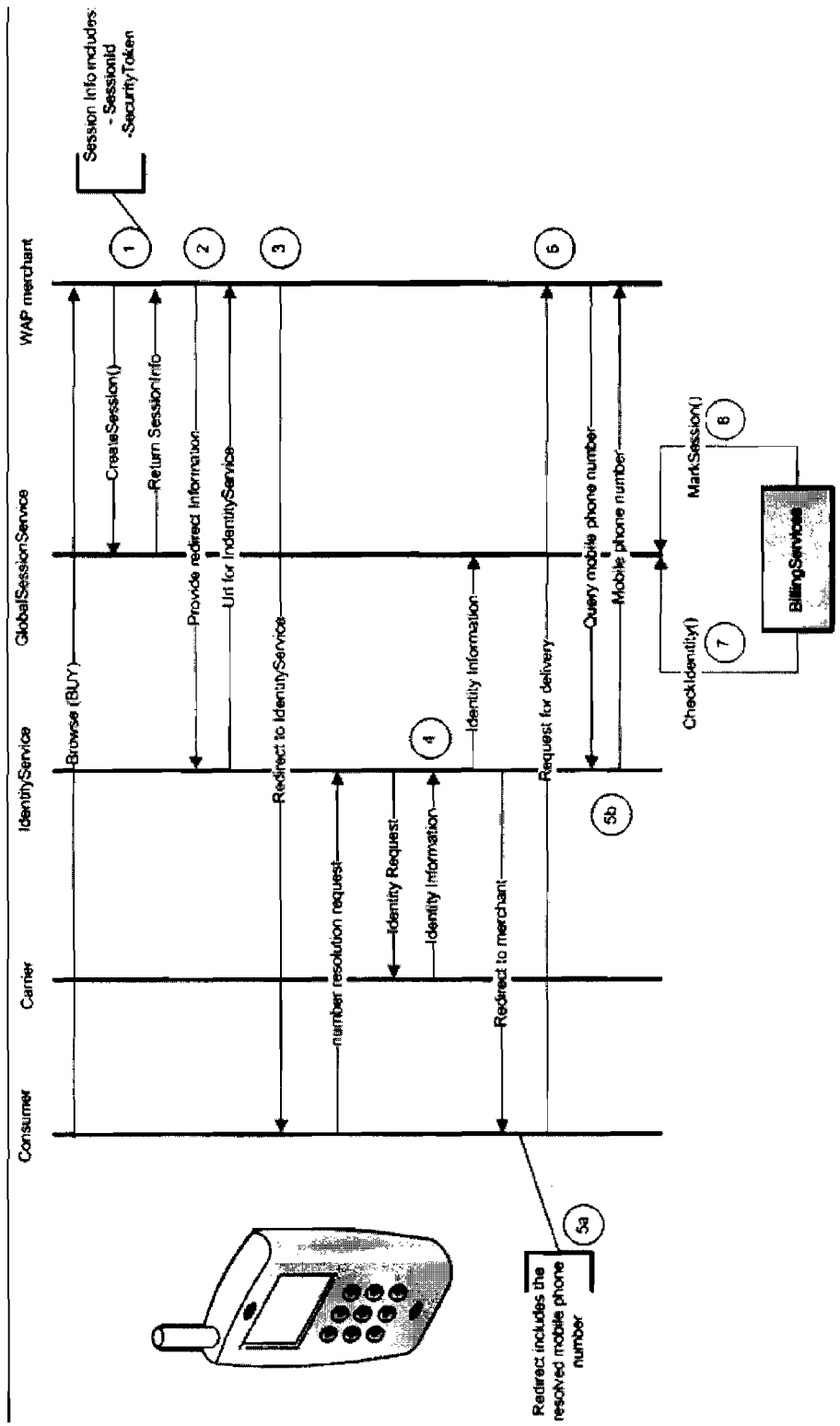
FIG. 8B is a sequence diagram for a system for providing billing for transactions from mobile devices.

FIG. 8B is a sequence diagram for a system for providing billing for transactions from mobile devices. The sequence is similar to the flow shown in FIG. 2B. As shown in the exemplary process, a user of a mobile device may browse for merchandise at a merchant using a WAP protocol, and may select an item for purchase. The merchant then sends a communication to the global session service to create a session, and the global session service responds with session information, which may include a session ID and a security token. The merchant then sends a request to provide redirect information to an identity service, and the service responds by providing a url associated with the identity service. The merchant places the url in a message to the mobile device in a manner that causes the mobile device to be redirected to the identity service.

Upon receiving the redirect information, the mobile device sends a number resolution request to the identity service, which may be configured to obtain identity information from a carrier associated with the mobile device by making an identity request and receiving back the identity information, such as a phone number for the mobile device. The identity service may also pass the identity information to the global session service, which may then store the information in association with the session information.

The identity service may then send a message redirecting the mobile device back to the merchant. The redirect may occur by standard approaches, but may also include the resolved mobile phone number (including in an encrypted or otherwise protected form). Upon receiving the redirect instruction, the mobile device may contact the merchant again to request delivery of the purchased item, such as online content in the form of music or ring tones. The merchant may then query the identity service for the mobile phone number, and the identity service may return the number to confirm that the appropriate device or account is to be identified. Where the transaction involves a billing component, the global session service may then contact a billing service to check the identity of the account associated with the phone number, and may mark the session as having been paid.

Figure 9:
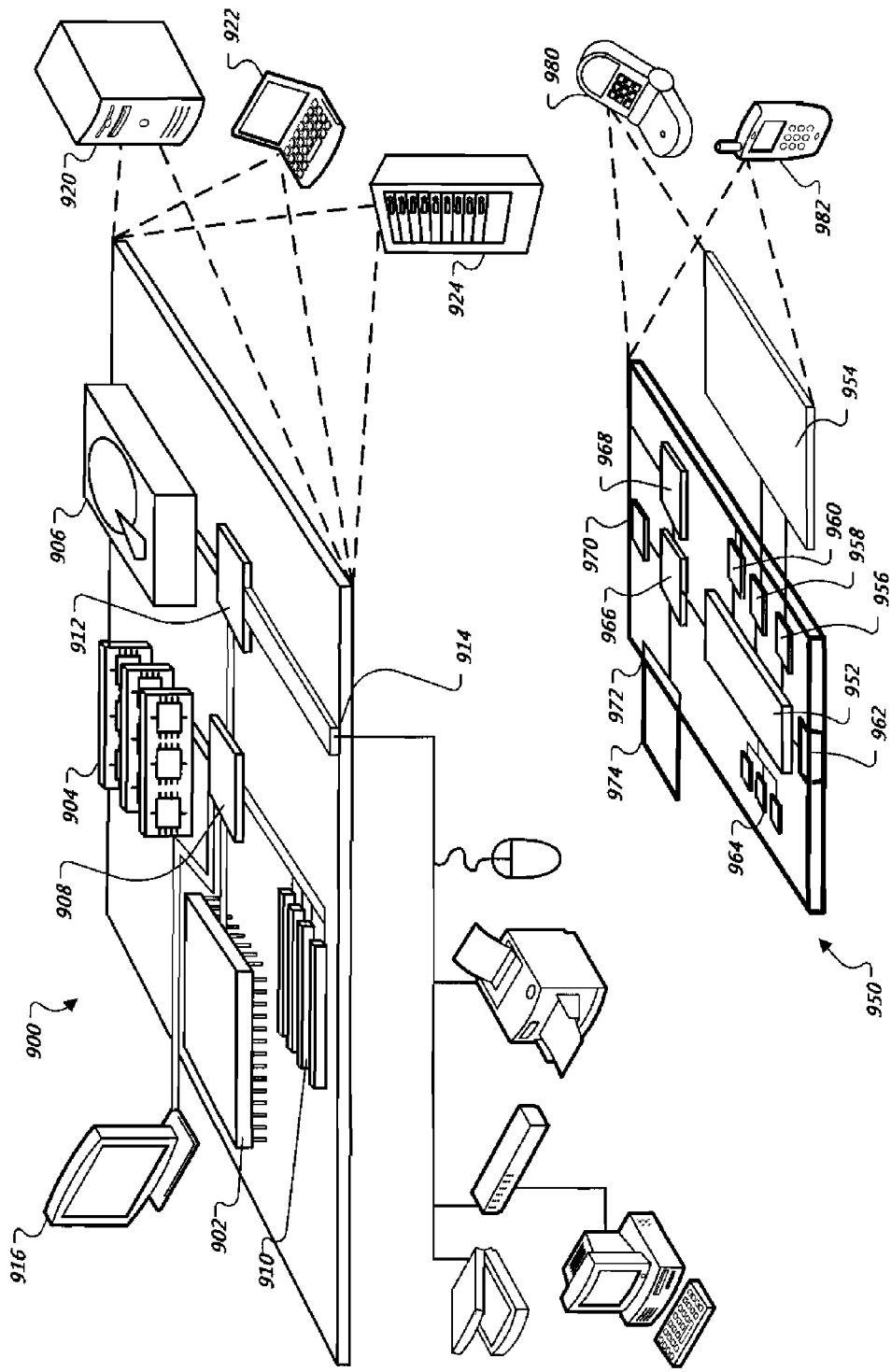
FIG. 9 shows schematic representations of two general computing systems.

FIG. 9 shows schematic representations of two general computing systems that may implement the features and techniques described above. Computing device 900 is intended to represent various forms of digital computers, such as laptops, desktops, workstations, personal digital assistants, servers, blade servers, mainframes, and other appropriate computers. Computing device 950 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, memory on processor 902, or a propagated signal.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT (Thin-Film-Transistor Liquid Crystal Display) display or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In-Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, memory on processor 952, or a propagated signal that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 880. It may also be implemented as part of a smartphone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse, trackball, touch-sensitive screen, or iDrive-like component) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network).

Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the description here. For example, various forms of the flows shown above may be used, with steps re-ordered, added, or removed. Also, although several applications and methods have been described, it should be recognized that numerous other applications are contemplated. Accordingly, other embodiments are within the scope of the following claims.

What is claimed is:

1. A computer-implemented method of identifying a mobile device for carrying out a transaction, the method comprising: receiving, at a commerce computer server system, from a wireless access protocol (WAP) enabled mobile device a purchase request; performing a redirect process to obtain a telephone number for a WAP enabled mobile device by: providing from the commerce computer server system to the mobile device, and in response to receiving the purchase request, a WAP callback uniform resource locator (URL) that includes a session ID and information to direct the mobile device to a device identification server system that is separate from the commerce computer server system and to allow the device identification server system to redirect the mobile device back to the commerce computer server system; receiving, at the commerce computer server system, redirect information from the mobile device including a URL that includes the session ID and the telephone number assigned to the mobile device; obtaining from the URL an identifier for conducting commerce with the device, the identifier comprising the telephone number assigned to the mobile device for identifying a user or account associated with the mobile device, initiating a payment process by requesting by the commerce computer system a transaction authorization from a billing server system associated with the device using the telephone number provided by the device identification server system; using the commerce computer system to cause the mobile device to be provided with electronic content based on obtaining the telephone number; and providing from the commerce computer server system to the billing server system a request to charge the transaction; subsequent to providing the request to charge the transaction, determining that delivery of the electronic content to the mobile device was not successful; and launching a cancel transaction process.

2. A computer-implemented method of identifying a mobile device for carrying out a transaction, the method comprising:
receiving, at a computer system, from a mobile device a purchase request;
providing from the computer system to the mobile device a redirect message to direct the mobile device to a device identification server system; and
obtaining, at the computer system, an identifier for conducting commerce with the device, the identifier comprising a telephone number assigned to the mobile device;
requesting by the computer system a transaction authorization from a billing server system associated with the device using the telephone number provided by the device identification server system;
using the computer system to cause the mobile device to be provided with electronic content based on obtaining the telephone number; and
subsequent to causing the mobile device to be provided with the electronic content, providing from the computer system to the billing server system a request to charge the transaction;
subsequent to providing the request to charge the transaction, determining that delivery of the electronic content to the mobile device was not successful; and
launching a cancel transaction process.

3. The method of claim 1, wherein the uniform resource locator is encrypted.

4. The method of claim 1, further comprising authorizing provision of the electronic content by contacting the carrier from the commerce computer server system using the identifier.

5. The method of claim 4, wherein the identifier is provided in a redirect message.

6. The method of claim 1, wherein the identifier is obtained by the device identification server system from a telecommunications carrier that serves the mobile device.

7. The method of claim 1, further comprising decrypting the identifier before requesting a transaction authorization.

8. A computer-implemented method of providing identifying information for a mobile device commercial transaction, the method comprising:
receiving from a mobile device an identity resolution request in a uniform resource locator (URL);
requesting from a mobile carrier associated with the mobile device identity information, and receiving in response identity information regarding the mobile device in a second uniform resource locator (URL), the identity information comprising a telephone number assigned to the mobile device;
providing the telephone number for use by a marketplace; and
providing a redirect message to direct the mobile device to a site associated with the mobile marketplace for effecting a transaction involving payment by a user associated with the mobile device.

9. The method of claim 8, further comprising identifying the mobile carrier associated with the mobile device.

10. The method of claim 8, wherein the redirect message includes information in the identity resolution request and the identity information.

11. The method of claim 10, wherein the redirect message includes a session ID associated with the identity resolution request.

12. The method of claim 8, wherein the redirect message comprises information encrypted using a key that is shared with the mobile marketplace.

13. The method of claim 8, further comprising determining whether identity information has previously been requested for the mobile device during a session.

14. The method of claim 8, further comprising providing the identity information directly to a billing system.

15. The method of claim 14, wherein the billing system is part of a common system with the marketplace.

16. A system for identifying mobile devices for carrying out purchase transactions, comprising: a marketplace server configured to redirect mobile devices to a mobile device identification server based on a purchase request received from the mobile device using a wireless access protocol (WAP) callback uniform resource locator (URL) that includes a session ID and information; and a mobile device identification server configured to receive redirected mobile devices, request identity information from carriers associated with the mobile devices, the identity information comprising a telephone number assigned to the mobile device, and redirect mobile devices back to the marketplace server by providing to the marketplace server a URL that includes the session ID and the telephone number assigned to the mobile device.

17. The system of claim 16, wherein the identification server is further configured to provide identity and session information with redirect messages sent to the mobile devices.

18. The system of claim 16, further comprising corresponding encryptors and decryptors associated with the marketplace server and the identification server to protect the identity information.

19. The system of claim 16, wherein the marketplace server and the identification server redirect mobile devices using HTTP redirects.

20. A system for identifying mobile devices for carrying out purchase transactions, comprising:

an interface adapted to receive a redirected message from a mobile device;

an identity requester configured to associate the mobile device with a mobile operator and to obtain identification information about the mobile device, the identification information comprising a telephone number assigned to the mobile device; means for redirecting the mobile device for completing a purchase transaction based at least in part on an identifier associated with the obtained telephone number provided in a uniform resource locator (URL); and means for determining that delivery of the electronic content to the mobile device was not successful and launching a cancel transaction process.

* * * * *

UNITED STATES PATENT AND TRADEMARK OFFICE
CERTIFICATE OF CORRECTION

| | | |
|---|---|---|
| PATENT NO. | : 8,532,612 B1 | |
| APPLICATION NO. | : 11/694830 | |
| DATED | : September 10, 2013 | |
| INVENTOR(S) | : Bernd Holzhey | |

It is certified that error appears in the above-identified patent and that said Letters Patent is hereby corrected as shown below:

In the Claims

Column 20, line 60, Claim 15, please delete "method of 14" and insert therefor
-- method of claim 14 --

Signed and Sealed this
Twelfth Day of November, 2013

Teresa Stanek Rea
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,532,612 B1 | Page 1 of 1 |
| APPLICATION NO. | : 11/694830 | |
| DATED | : September 10, 2013 | |
| INVENTOR(S) | : Holzhey et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 606 days.

Signed and Sealed this
Tenth Day of March, 2015

Michelle K. Lee
*Deputy Director of the United States Patent and Trademark Office*